No. 701,353.  
G. A. KENNEDY.  
SPEED REGISTERING ATTACHMENT FOR VEHICLES.  
(Application filed Aug. 29, 1901.)  
(No Model.)  
Patented June 3, 1902.  
2 Sheets—Sheet 1.
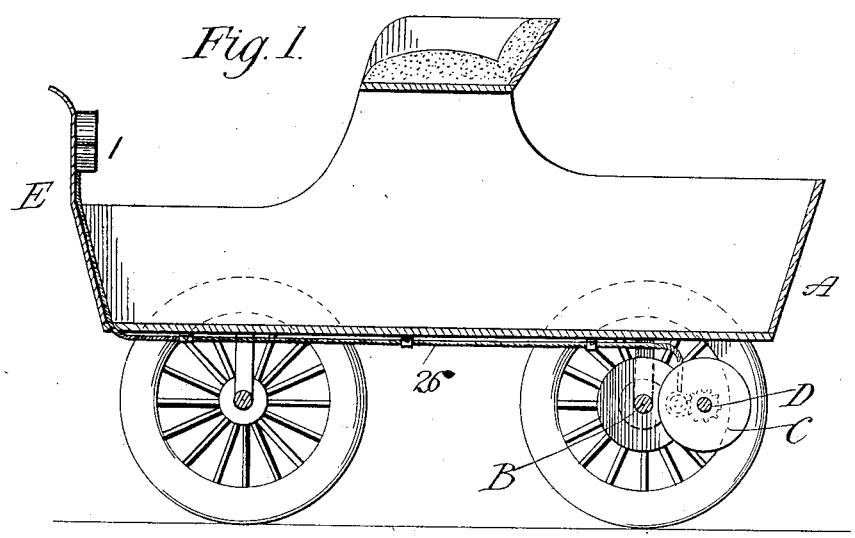
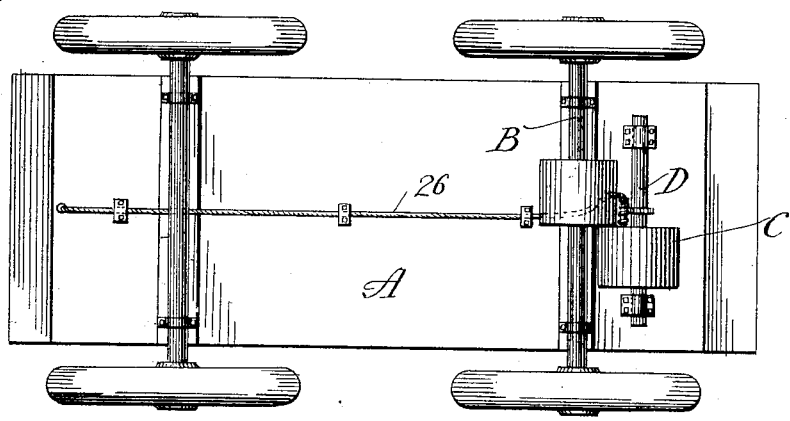

No. 701,353. Patented June 3, 1902.
G. A. KENNEDY.
SPEED REGISTERING ATTACHMENT FOR VEHICLES.
(Application filed Aug. 29, 1901.)
(No Model.) 2 Sheets—Sheet 2.
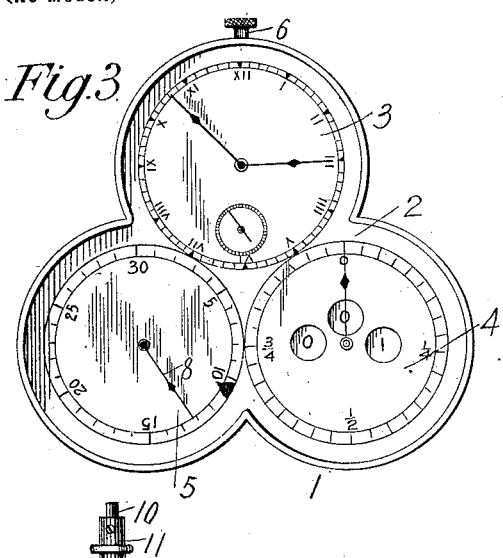
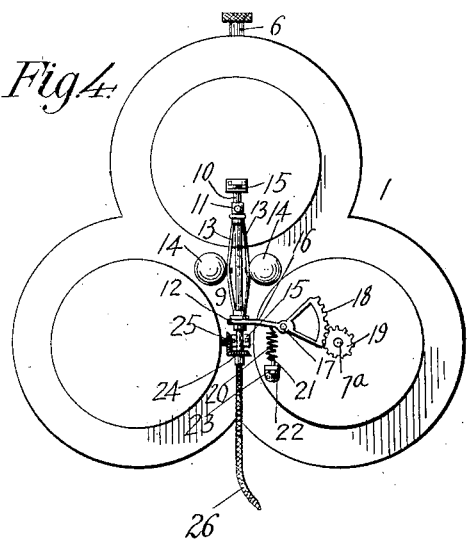
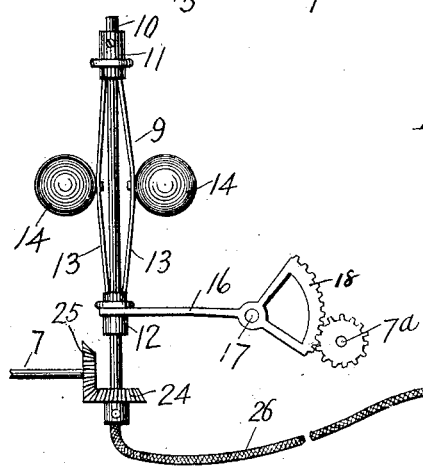
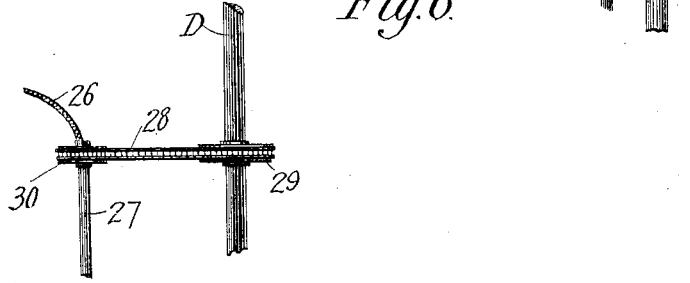
George A. Kennedy Inventor
Witnesses:
By H. B. Willson & Co.
Attorneys
THE NORRIS PETERS CO., PHOTO-LITHO., WASHINGTON, D. C.

UNITED STATES PATENT OFFICE.

GEORGE A. KENNEDY, OF BLISSFIELD, MICHIGAN.

SPEED-REGISTERING ATTACHMENT FOR VEHICLES.

SPECIFICATION forming part of Letters Patent No. 701,353, dated June 3, 1902.

Application filed August 29, 1901. Serial No. 73,732. (No model.)

*To all whom it may concern:*

Be it known that I, GEORGE A. KENNEDY, a citizen of the United States, residing at Blissfield, in the county of Lenawee and State of Michigan, have invented certain new and useful Improvements in Speed-Registering Attachments for Vehicles; and I do declare the following to be a full, clear, and exact description of the invention, such as will enable others skilled in the art to which it appertains to make and use the same.

This invention relates to improvements in speed-registering attachments for vehicles.

The object of the invention is to provide a speed-indicator which may be applied to the dash or some other suitable part of an automobile, car, or other vehicle and connected up with the running-gear of the vehicle, so as to receive motion therefrom and accurately indicate the speed of the vehicle, and to provide a device of this character which is simple of construction, comparatively inexpensive of production, and so constructed as to reduce to the minimum liability of derangement of the registering mechanism by the jolting or vibration of the vehicle.

A further object of the invention is to provide means for registering the distance traveled as well as the rate of speed of the vehicle, combined with means for operating both from a common source of power.

A still further object of the invention is to provide an inclosing casing for the speed-indicator which is adapted to also incase the cyclometer or distance-indicator and a timepiece, whereby all three devices will be arranged for convenient inspection.

With these and other objects in view the invention consists of certain novel features of construction, combination, and arrangement of parts, as will be hereinafter more fully described, and particularly pointed out in the appended claim.

In the accompanying drawings, Figure 1 is a longitudinal section through a conventional form of motor-vehicle, illustrating the application of the invention thereto. Fig. 2 is a bottom plan view thereof. Fig. 3 is a front elevation of the indicating device. Fig. 4 is a rear elevation thereof, showing the gearing. Fig. 5 is a diagrammatic view of the gearing and flexible shaft, and Fig. 6 is a view showing a different manner of connecting up the flexible shaft with the driving-axle of the vehicle.

A in the drawings represents a motor-vehicle of any ordinary type; B, its driving-axle; C, the motor; D, the motor-shaft, which through the medium of suitable gearing communicates motion to said axle, and E the dash of the vehicle.

In carrying my invention into practice I provide a suitable inclosing casing 1, of such shape and size as to receive a suitable form of timepiece, such as a watch or clock, a cyclometer or distance-indicator, and the indicating devices of the speed-regulating means. The face 2 of the casing is provided with three dials—a time-dial 3, a cyclometer-dial 4, and the speed-registering dial 5. If desired, however, spaces may be left in the face 2 for exposing the dials of a timepiece and a cyclometer of ordinary construction suitably supported within said casing 1. A timepiece of the stem winding and setting type is preferably employed, and its stem 6 is extended to the exterior through the casing, so that it may be conveniently wound and set from the exterior.

7 indicates the driving-shaft of the cyclometer, and 7ª the shaft or stem of the speed-registering device, which carries a hand or pointer 8 to coöperate with the numerals on the dial 5.

The speed-registering mechanism comprises in its construction a centrifugal governor 9, consisting of a shaft or stem 10, to which is keyed a collar 11 and on which is slidably mounted a second collar 12, the said two collars being connected by spring metal arms 13, carrying the governor-weights 14. As the shaft or stem 10 rotates the balls 14 move outward or inward, according to the speed thereof, and raise and lower the sliding sleeve 12 in the usual manner. The spring-arms 13 are designed to take up or absorb the vibration produced by the jolting of the vehicle and prevent the same from being transferred to and interfering with the operation of the interposed gearing actuating the shaft 7ª of the speed-registering device. The stem 10 is mounted in suitable bearings 15 upon the rear of the casing 1.

Pivoted to the rear of the casing is an oscillating lever 16, which is connected at one end to the sliding sleeve 12 of the governor and is pivoted at its opposite end upon a pivot-pin 17, suitably mounted upon said casing 1. This lever carries a toothed sector 18, which meshes with a pinion 19 on the rear end of the shaft 7ᵃ, whereby as the sleeve 12 rises and falls under the action of the governor motion is communicated through the sector 18 and pinion 19 to said shaft 7ᵃ to turn the hand or pointer 8 in one direction or the other to indicate the speed of the vehicle upon which the speed-registering device is applied.

The casing 1 is secured in any desired manner to the dash E or to some other suitable part of the vehicle, but preferably to the dash, so that the dials of the time, distance, and speed registering devices may be conveniently inspected from the front or driver's seat.

In order to increase or decrease the resistance of the lever 16 to its action by the governor and to enable the gearing to be set to register with accuracy, I provide a tension-spring 20, which is connected at one end to said lever 16 and at its opposite end to a threaded stem 21, which projects through a suitable bearing 22 on the casing 1 and has applied thereto an adjusting-nut 23, by which the tension of the spring may be adjusted as required. This spring also serves the further function of a device for absorbing vibration to prevent the lever 16 from being unduly influenced by the jolting of the vehicle.

The shaft 10 carries a bevel-gear 24, which meshes with a bevel-gear 25 on the outer end of the driving-shaft 7 of the cyclometer, which gear 25 is simply substituted for the trip-wheel of the ordinary cyclometer and is properly proportioned according to the character of the running-gearing of the vehicle to properly operate the shaft 6 to actuate the mechanism of the cyclometer to accurately indicate the distance traveled by the vehicle.

The shaft or stem 10 is connected at its lower end to a flexible shaft 26, which projects downward through an opening formed in the floor of the vehicle and thence under the body of the vehicle to the rear, being suitably geared or connected at its opposite end to the shaft D of the vehicle-motor C, whereby the shaft 10 is rotated while the vehicle is in motion to operate the parts of the speed-registering mechanism. The shaft 26 may, however, be geared to a counter-shaft 27, receiving motion from the driving-axle D through the instrumentality of a belt or chain 28, passed over pulleys or sprocket-wheels 29 and 30 on said shafts, as shown in Fig. 6, this construction being employed where it is impracticable or not desired to connect the flexible shaft 26 directly with the motor-shaft D.

From the foregoing description, taken in connection with the accompanying drawings, the construction, mode of operation, and advantages of the invention will be readily understood, and it will be seen that as the shaft 10 is rotated the sleeve 12 will be caused to rise and fall, according to the speed of rotation thereof, whereby the lever 16 will be oscillated to cause the toothed sector 18 and pinion 19 to move the hand 8 toward and from the neutral point on the dial 5, and to thereby indicate the speed of the vehicle. By employing the spring 20 it will be seen that the lever 16 may be regulated to insure extreme accuracy, and by employing a governor of the specific construction described in connection with said spring the vibration produced by the jolting of the vehicle is taken up in an effective manner, so as to reduce to the minimum all liability of the parts of the indicating devices being affected thereby and registering inaccurately.

Changes in the form, proportion, and minor details of construction may be made within the scope of the invention without departing from the spirit or sacrificing any of the advantages thereof.

Having thus described my invention, what I claim as new, and desire to secure by Letters Patent, is—

In a speed-registering mechanism, the combination with a governor consisting of a stem having a keyed and a sliding collar thereon, spring-arms connected at their opposite ends to the collars; of a pivoted lever with a toothed sector mounted on the sliding collar, a suitably-connected pinion meshing with the sector, means for rotating the stem to give the springs an inward and outward movement and move the sliding collar upward or downward so as to oscillate the pivoted lever, and a tension-spring connected to said oscillating lever, and adjusting means on the same whereby to increase or decrease the resistance of the oscillating lever to its action by the governor and enable the gearing to be set with accuracy, said tension-spring also serving to coact with the spring-arms to absorb vibration, thereby preventing the said oscillating lever from being unduly influenced by the jolting of the vehicle to which said registering mechanism is attached, substantially as specified.

In testimony whereof I have hereunto set my hand in presence of two subscribing witnesses.

GEORGE A. KENNEDY.

Witnesses:
W. J. FEBRING,
R. McWILLIAMS.